United States Patent
Odryna et al.

[11] Patent Number: 6,104,414
[45] Date of Patent: Aug. 15, 2000

[54] VIDEO DISTRIBUTION HUB

[75] Inventors: Victor Odryna, Acton; Robert L. Gilgen, Westford; Mark A. Desmarais, Northborough; Barry N. Mansell, Groton; Keith E. Henry, Tyngsboro, all of Mass.

[73] Assignee: Cybex Computer Products Corporation, Huntsville, Ala.

[21] Appl. No.: 08/909,924

[22] Filed: Aug. 12, 1997

Related U.S. Application Data

[60] Provisional application No. 60/040,730, Mar. 12, 1997.

[51] Int. Cl.$^7$ ................................................ G09G 5/36
[52] U.S. Cl. ............................ 345/509; 345/508; 345/1; 345/521
[58] Field of Search .................... 345/1–3, 98, 103, 345/132, 507–509, 87, 90, 521; 348/778, 840

[56] References Cited

U.S. PATENT DOCUMENTS

| | | | |
|---|---|---|---|
| Re. 33,916 | 5/1992 | Saenz et al. ........................... | 340/703 |
| 3,743,773 | 7/1973 | Sobel ..................................... | 178/7.3 |
| 3,765,011 | 10/1973 | Sawyer et al. ........................ | 340/324 |
| 3,786,479 | 1/1974 | Brown et al. ......................... | 340/324 |
| 3,961,269 | 6/1976 | Alvarez, Jr. .......................... | 328/62 |
| 4,635,105 | 1/1987 | Favreau ................................. | 358/67 |
| 4,727,362 | 2/1988 | Rackley et al. ....................... | 340/703 |
| 4,760,388 | 7/1988 | Tatsumi et al. ....................... | 340/717 |
| 4,823,286 | 4/1989 | Lumelsky et al. .................... | 364/521 |
| 4,947,244 | 8/1990 | Fenwick et al. ...................... | 358/86 |
| 4,965,559 | 10/1990 | Dye ....................................... | 340/717 |
| 5,084,666 | 1/1992 | Bolash .................................. | 323/283 |
| 5,105,183 | 4/1992 | Beckman .............................. | 340/717 |
| 5,113,180 | 5/1992 | Gupta et al. .......................... | 340/747 |
| 5,218,775 | 6/1993 | Singer ................................... | 40/617 |
| 5,261,735 | 11/1993 | Cohen et al. ......................... | 312/282 |
| 5,276,458 | 1/1994 | Sawdon ................................. | 345/132 |
| 5,313,592 | 5/1994 | Buondonno et al. ................. | 395/325 |
| 5,335,081 | 8/1994 | Yamaguchi et al. ................. | 358/342 |
| 5,361,078 | 11/1994 | Caine .................................... | 345/1 |
| 5,374,940 | 12/1994 | Corio ..................................... | 345/1 |
| 5,396,257 | 3/1995 | Someya et al. ....................... | 345/1 |
| 5,403,457 | 4/1995 | Nago et al. ........................... | 204/192.2 |
| 5,404,452 | 4/1995 | Detschel et al. ..................... | 395/250 |
| 5,418,962 | 5/1995 | Bodin et al. .......................... | 395/700 |
| 5,448,291 | 9/1995 | Wickline ............................... | 348/159 |
| 5,459,477 | 10/1995 | Fukuda et al. ........................ | 345/1 |
| 5,488,385 | 1/1996 | Singhal et al. ....................... | 345/3 |
| 5,502,808 | 3/1996 | Goddard et al. ..................... | 395/162 |
| 5,513,365 | 4/1996 | Cook et al. ........................... | 395/800 |
| 5,515,511 | 5/1996 | Nguyen et al. ....................... | 395/200.2 |
| 5,523,769 | 6/1996 | Lauer et al. .......................... | 345/1 |
| 5,532,719 | 7/1996 | Kikinis .................................. | 345/211 |
| 5,539,465 | 7/1996 | Xu et al. ............................... | 348/388 |
| 5,606,336 | 2/1997 | Yuki ...................................... | 345/1 |
| 5,657,046 | 8/1997 | Noble et al. .......................... | 345/123 |
| 5,828,349 | 10/1998 | MacHesney et al. ................ | 345/3 |
| 5,841,430 | 11/1998 | Kurikko ................................ | 345/3 |

*Primary Examiner*—Kee M. Tung
*Attorney, Agent, or Firm*—Nixon & Vanderhye P.C.

[57] ABSTRACT

A video distribution hub and display method are disclosed which is capable of driving a plurality of video display monitors as a virtual monitor or monitors. The video distribution hub receives a video signal from a single head graphics card or a suitable video source which signal embodies data within a video buffer on the graphics card or at the video source. The hub processes the received video signal and stores selected data segments corresponding to selected portions of the video buffer in a plurality of frame buffers within the distribution hub. The data stored within the plurality of frame buffers is employed to drive respective video displays, such as flat panel displays or conventional CRT displays. The hub accommodates displays of different resolution. Additionally, the hub accommodates displays having either a portrait or landscape orientation.

52 Claims, 8 Drawing Sheets

FIG. 14
FIG. 13
FIG. 11
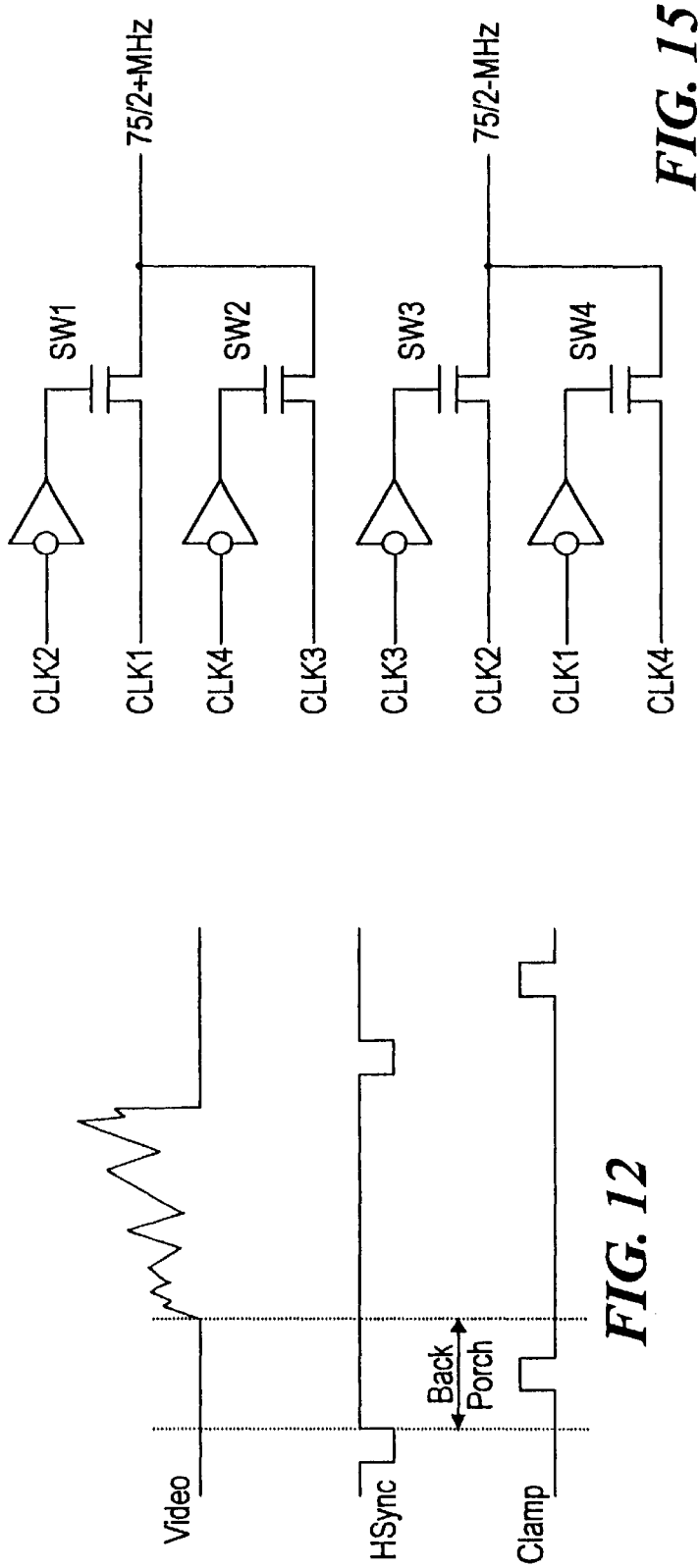
FIG. 15
FIG. 12

VIDEO DISTRIBUTION HUB

CROSS REFERENCE TO RELATED APPLICATIONS

This application claims priority of U.S. Provisional Patent Application No. 60/040,730, filed Mar. 12, 1997.

STATEMENT REGARDING FEDERALLY SPONSORED RESEARCH OR DEVELOPMENT

Not applicable.

BACKGROUND OF THE INVENTION

Modern trading floors seek to maximize their productivity by increasing utilization of floor space. This means that floor designers must squeeze as many traders as possible onto the floor, while providing these traders with large amounts of visual data. This data comes in the form of computer-generated text and graphical data, video feeds, and analog text feeds. While the increasing need for data drives up the number and size of these data displays, a clear line-of-sight between traders is often needed to facilitate communications between them.

The historical technology of choice for displaying the data on trading floors has been the CRT. As information needs have grown, so has the size of the CRT necessary to display that data. At the present time, CRT displays with a twenty-one inch diagonal (nineteen inches usable diagonal) is the largest display commonly used, while the seventeen inch CRT (fifteen inches usable diagonal) is the most prevalent display. Multiple monitors are frequently connected to a single host computer to allow large amounts of data be displayed, while requiring only one set of user interaction devices (such as keyboard and mouse) and a single computer.

Recently, flat panel monitors have begun to make inroads into the desktop trading market. Primarily based on Liquid Crystal Displays (LCDs), these monitors typically consume 70% less power, have smaller bezels, and are only three to six inches in depth. Because of their relatively small size, these displays allow trading desks to be made much smaller, and they can be mounted in ways which are difficult and costly with CRTs. Unfortunately, LCD monitors are still quite expensive.

As mentioned earlier, multi-head displays are quite common in the desk trading market. Typically, multiple graphics cards are inserted into the host PC, each driving one monitor. Alternatively, specialized multi-head graphics cards are available which can drive two or four heads simultaneously. Both of these methods have substantial drawbacks. The first suffers in that the limited number of computer bus slots (usually only three PCI-style) available in a typical PC are squandered by the graphics cards. The limited number of bus slots means that only three heads may be connected to a single PC using this method. The second method suffers because the specialized multi-head graphics cards are quite expensive, and tend to lack features present in leading-edge single-head cards. One such multi-head card actually provides on a single card the circuitry normally found on two graphics card in order to drive two displays.

BRIEF SUMMARY OF THE INVENTION

The present invention enables the provision of a multi-head virtual monitor from the perspective of a host computer via the use of one or more video distribution hubs. Each hub receives a video signal from a standard graphics card in a PC and generates output signals appropriate for driving a plurality of video displays such as flat panel or Cathode Ray Tube (CRT) video displays. The video displays may be oriented either horizontally, in landscape mode, or vertically, in portrait mode, or in a combination of landscape and portrait arrangements. Additionally, a single hub can drive displays of differing resolutions as well as head orientations. The hub, in combination with host software, can be automatically reconfigured when a display is swapped out to accommodate the newly substituted display. In a preferred embodiment, the hub is particularly adapted for driving a plurality of flat panel displays such as active matrix flat panel displays, dual scan passive flat panel displays, or a combination of such displays.

More particularly, in a preferred embodiment, a video graphics system in accordance with the present invention includes a video graphics adapter having a host interface for coupling the video graphics adapter to a host computer such as a personal computer, workstation, microcomputer, minicomputer, mainframe or the like, and an output for driving a video data signal, such as an RGB analog video signal. The video graphics adapter includes an "oversize" display buffer which has a buffer capacity greater than that necessary to drive a single video display. The video graphics system further includes a video distribution hub which has a video input interface for receiving a video signal, such as the RGB analog video signal from the video graphics adapter, and a plurality of output ports for driving associated displays.

The video distribution hub receives the video signal from the video graphics adapter at the video input interface of the video distribution hub and, in the case where the received signal is an analog signal, applies the signal to an analog to digital converter (ADC) to generate digital signals corresponding to red, green and blue data signals. The digital video is applied to a bus which feeds a plurality of frame buffer logic sections within the video distribution hub. Each frame buffer logic portion within the video distribution hub includes a frame buffer which is employed to drive a display coupled to an output of the respective frame buffer logic portion.

In an alternative embodiment of the present invention, the hub is configured to accept a digital input prior to selectively storing data in associated frame buffers. A further alternative embodiment of the present invention provides an analog output suitable, for instance, for driving conventional CRTs.

BRIEF DESCRIPTION OF THE DRAWINGS

The invention will be more fully understood from the following detailed description taken in conjunction with the accompanying drawings in which:

FIG. 11 illustrates the Analog Front End of FIG. 4;

FIG. 12 illustrates back porch clamp timing;

FIG. 13 illustrates the function of the A/D of FIG. 4;

FIG. 14 is an equivalent circuit of the phase fine tune block of FIG. 4;

FIG. 15 illustrates interconnected switches employed in the video clock regenerator circuit of FIG. 4.

DETAILED DESCRIPTION OF THE INVENTION

A common video graphics adapter for coupling a host computer such as a personal computer (PC), workstation, microcomputer, minicomputer, mainframe or the like to a video display typically provides an "oversize" display buffer which has a buffer capacity greater than that necessary to drive a single, conventionally-sized video display. This oversize display buffer and the data contained therein is illustrated in FIGS. 1A–1D as a large field 10 of video data available for display.

Figure 1A:
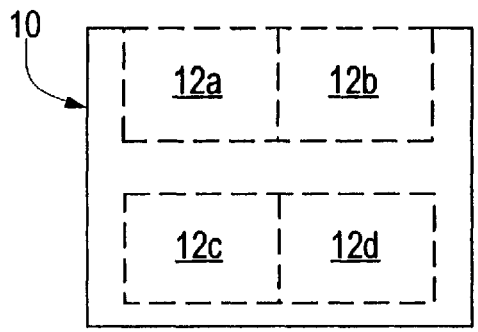
FIGS. 1A–1D illustrate the contents of a video buffer divided among two or more portions which are subsequently displayed on respective display devices in a variety of configurations, as enabled by the present invention.
Figure 1A:
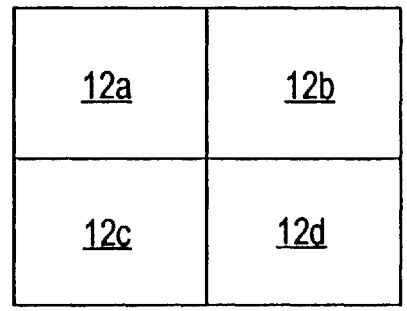
Figure 1B:
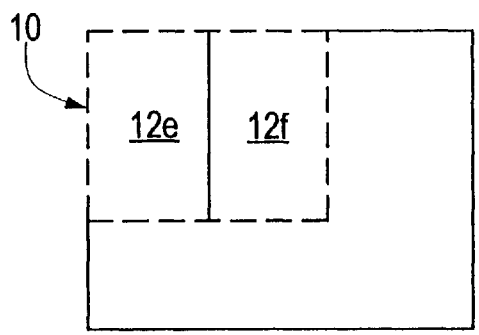
Figure 1B:
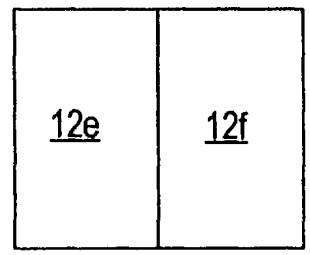
Figure 1C:
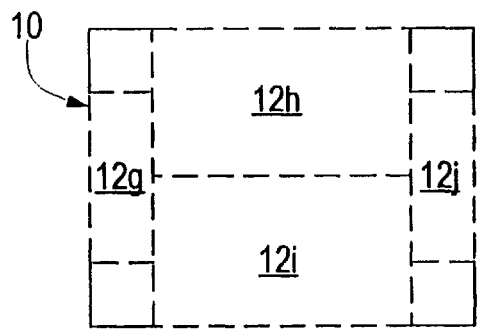
Figure 1C:
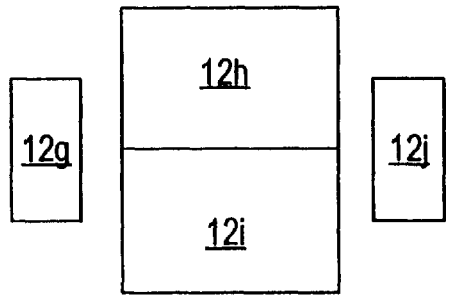
Figure 1D:
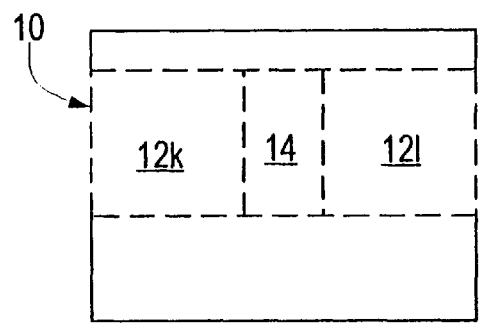
Figure 1D:
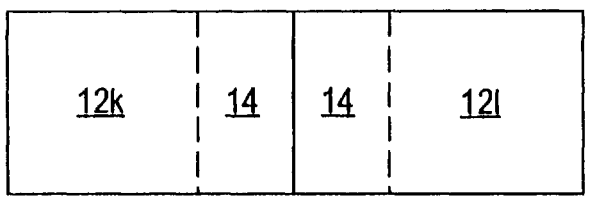

As previously indicated, it is often desirable to simultaneously display two or more portions 12 of this adapter buffer field 10. In FIG. 1A, it is desired to take four non-contiguous, horizontally oriented portions 12a–12d from the adapter buffer field 10 and to display them on adjacent display devices. In FIG. 1B, it is desired to take two vertically-oriented portions 12e, 12f from the same video graphics adapter buffer field 10 and to display them on adjacent, vertically-oriented displays. In FIG. 1C, a mix of vertically- and horizontally-oriented portions 12g–12j are taken from the same adapter buffer field 10 and are subsequently displayed with the vertically-oriented portions 12g, 12j spatially displaced from the horizontally-oriented portions 12h–12i. Finally, in FIG. 1D, two horizontally-oriented portions 12k, 12l are taken from the same buffer field 10 and are then displayed on adjacent displays. In the latter case, each portion has a common, overlapping region 14 of video information.

For all of the foregoing examples, the present invention enables the simultaneous replication of multiple portions of a single oversize display buffer. The prior art, in contrast, requires the use of multiple video graphics adapters, each providing a buffer field for sourcing a respective buffer portion, particularly in the situation of FIG. 1D in which two portions to be displayed share a common region 14 of video information. The typical prior art video graphics adapter can also be used to provide video data to plural displays, however, the image displayed on each is the same.

Figure 2:
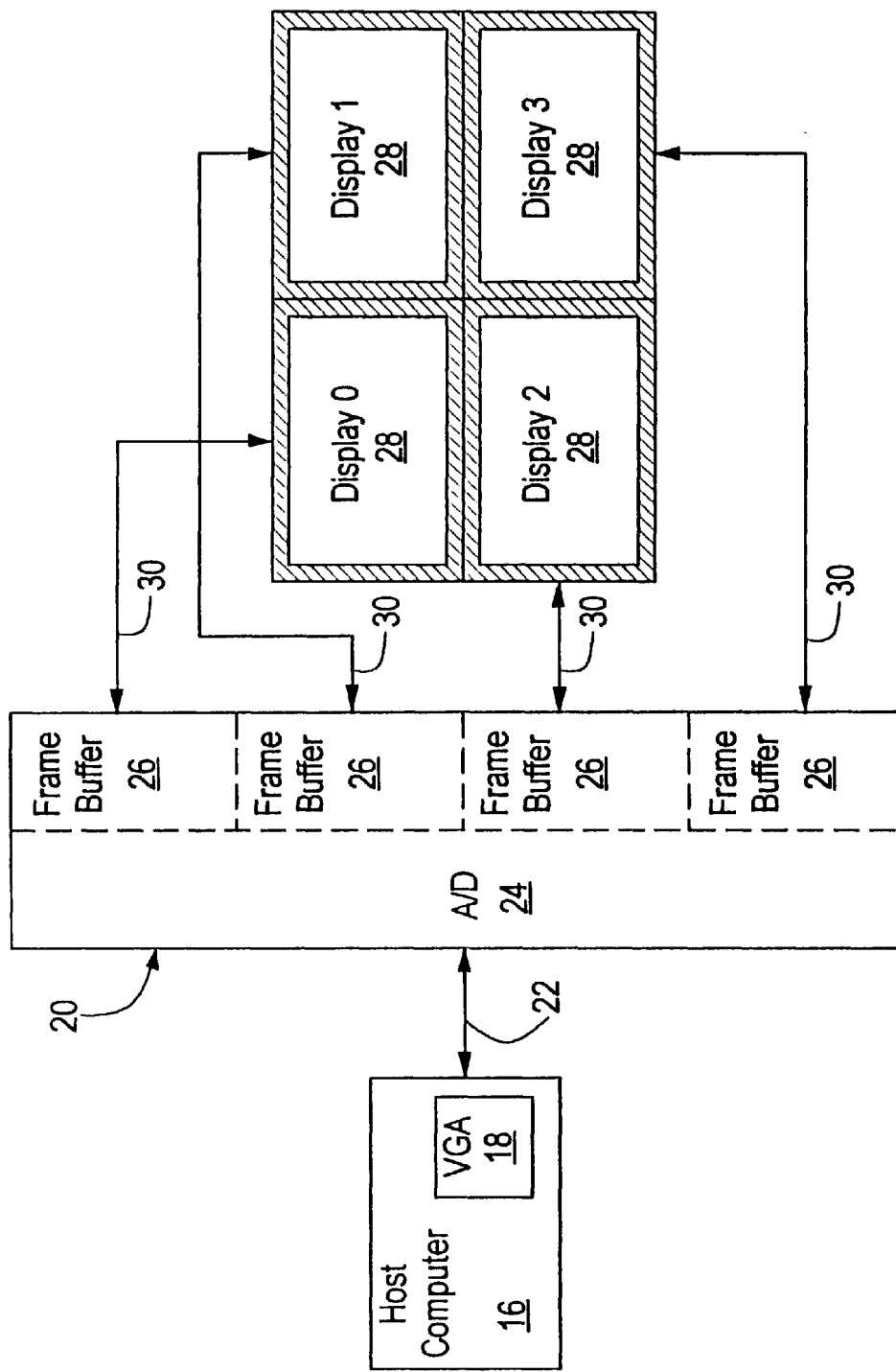
FIG. 2 is a top-level block diagram of a video distribution system according to the present invention.

The present invention is illustrated from a macroscopic point of view in FIG. 2. A host computer 16 provides input data to a video graphics adapter (VGA) 18 via a host computer interface such as a PCI bus. The VGA 18 is typically a circuit board installed within the host computer 16, though other physical embodiments and placements are envisaged. The graphics adapter 18 is used to generate text and graphical video data from the input data, and to make such video data available to display devices in an internal video display buffer.

In the prior art, the digital video data in the video display buffer is converted by the VGA 18 to an analog signal comprised of components for each of the fundamental colors employed by conventional display devices, red, green and blue (RGB). This analog signal is then available for conveyance to a conventional display device through a video data cable.

In the present invention, the video data in the video display buffer is received by a video distribution hub 20 via a video cable 22. Depending upon the protocol, horizontal sync (HSYNC) and vertical sync (VSYNC) are derived locally in the hub 20 from the analog RGB video data and/or through additional sync signals conveyed through the video data cable 22, as discussed subsequently. The video cable 22 also provides a DDC (display data channel) bus, a VESA (Video Electronics Standards Association) standard bus, for the purpose of enabling configuration control between the host computer 16 and the hub 20. Additionally, in a further embodiment, the video cable 22 provides a USB (Universal Serial Bus) connection between the host computer 16 and the hub 20, also for the purpose of configuration control. In a first embodiment, however, the USB connections are for future expansion and are terminated in a resistor pad found in conjunction with frame buffer circuitry, discussed subsequently.

The hub 20 is comprised of two major circuit blocks, an analog-to-digital (A/D) front end 24, and plural frame buffers 26. The A/D section 24 converts the color data for each of the RGB colors into a digital representation, and provides temporary storage for this digital data. There is one frame buffer per color per associated display device 28, or head; the frame buffers are each comprised of data gate arrays (to be discussed subsequently) which enable the storage of a selected portion of the video data coming from the VGA 18 in a local memory. The selected portion then is read out of the memory and is made available to the respective head 28 through a frame buffer output interface and associated cable 30.

The hub is an enclosure having approximate dimensions of seven inches in width, one inch in height, and nine inches in length, though other hub embodiments assume other relative and absolute dimensions. Heat relief is provided as required. Physical interfaces include an input port for receiving the RGB video stream over the video cable 22, a power supply connection for interfacing to a +12V unregulated (or regulated) power supply (not shown), and output ports for each frame buffer 26 enabling interconnection of the display device cable 30. LAN ports, such as a BNC connector and RJ45 connector, enabling intercommunication between plural hubs are also provided in one embodiment. A serial port is also provided, enabling a remote host (not necessarily the same host as that which houses the respective video graphics adapter) to provide command and control data to the hub, and to return data. This serial link can be used, for instance, to command the hub to initiate communication over the LAN with other LAN-connected hubs. In an exemplary embodiment, this serial port is an RS232 port.

In a preferred embodiment, the A/D section 24 and two of the frame buffers 26 are disposed on a first circuit card within the hub 20. Two further frame buffers 26 are located on a separate circuit card, also within the hub 20. In addition, in a further embodiment of the present invention, up to eight frame buffers are supported within the hub, all interfacing through a single A/D 24. Physical dimensions for such a hub 20 would of course be adjusted to accommodate the additional circuit cards.

Figure 3:
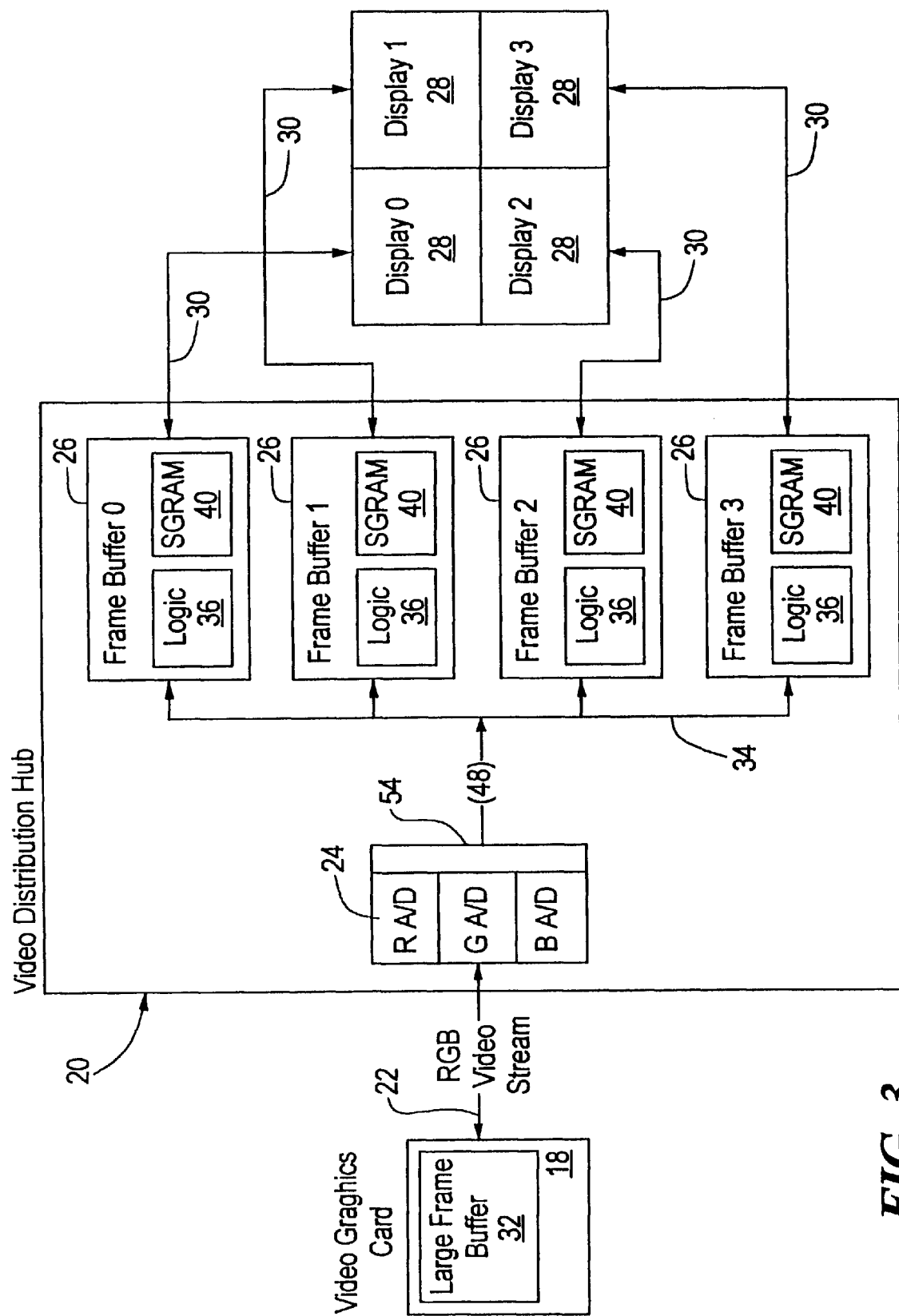
FIG. 3 provides a more detailed view of the block diagram of FIG. 2.

The present invention is discussed at a more detailed level with respect to FIG. 3. Here, the video display buffer 32, otherwise known as a large frame buffer, is illustrated in association with the video graphics card 18. Again, the RGB video data is illustrated as being conveyed from the video graphics card 18 to the hub 20, and in particular to the A/D section 24. Further detail on the A/D section is presented below.

Between the A/D section 24 and the plural frame buffers 26 is an internal bus 34. As shown, this parallel bus is 48 bits wide; there are eight bits per pixel per each of the three colors, or twenty-four bits per pixel, and it is desired to transmit two pixels per clock cycle. Over this bus 34 flows all of the digitized video data which corresponds to the complete contents of the video display large frame buffer 32 as received by the A/D section 24. It is within the frame buffer 26 logic that the determination of where to begin storing data and where to stop is made. By starting and stopping the storage of video data, each frame buffer section 26 is capable of providing to the respective video head 28 only that portion 12 of the total video display buffer 32 which is desired.

In FIG. 3, the frame buffers 26 are each illustrated as being comprised of a logic section 36 and an SGRAM (synchronous graphics RAM) 40. Essentially, the logic 36 is responsible for storing in the SGRAM 40 only video data associated with the video buffer portion 12 desired to be displayed on the respective display device 28. The SGRAM 40 provides temporary storage of this data to enable the timely provision of the data to the respective head 28. As will be discussed subsequently, there is logic and SGRAM associated with each color for each of the display devices.

Figure 4:
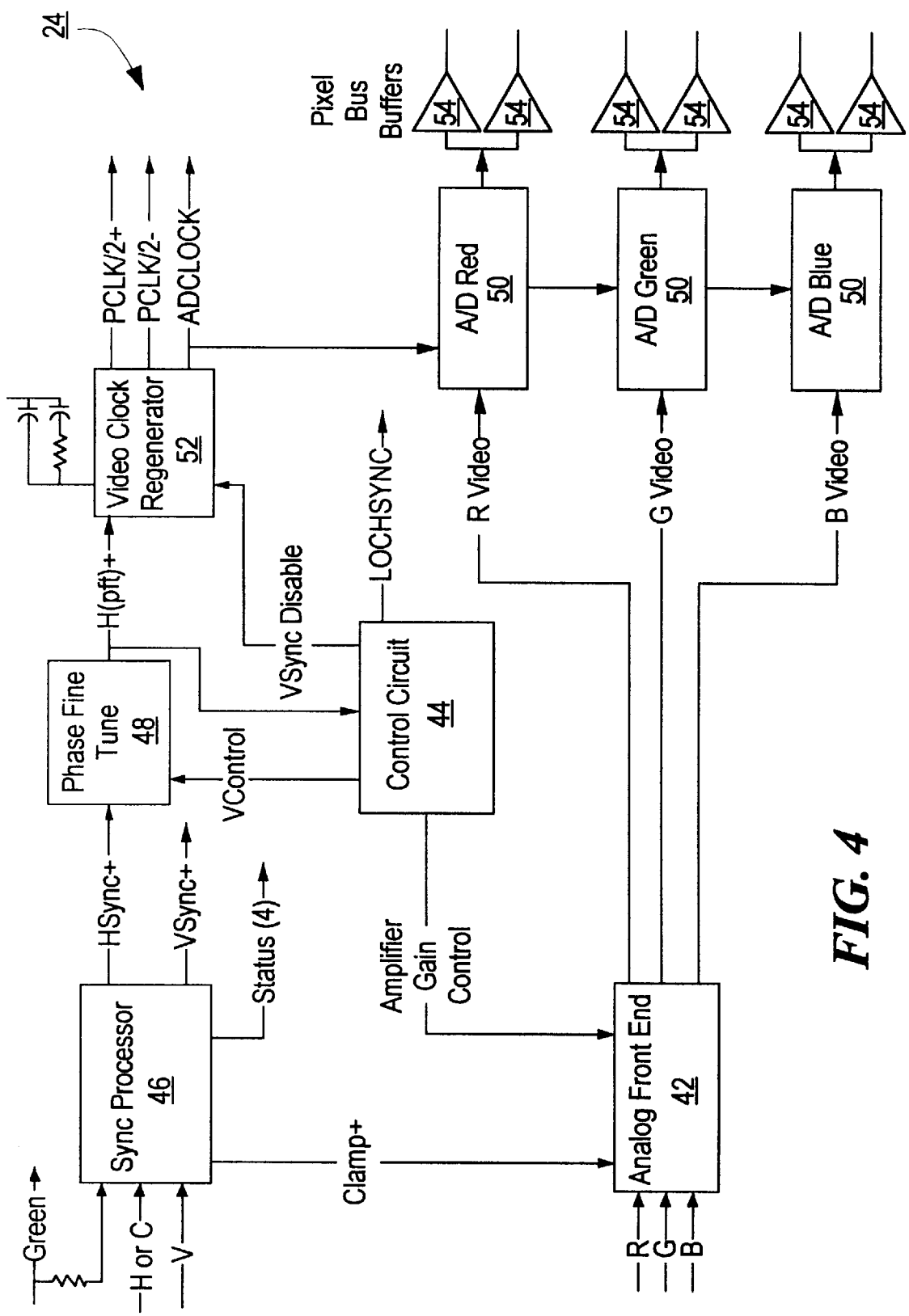
FIG. 4 is generally a block diagram of the block labelled "A/D" in FIG. 3.

With respect to FIGS. 4 and 11, the A/D section 24 is described in detail. An analog front end 42 AC couples the received analog RGB signal from the video cable 22. After being coupled in, the video signal for each color is approximately 0.7 Vpp, from the darkest to lightest extremes. Therefore, it is necessary for the analog front end 42 to amplify the video signal for each color, thus improving the signal to noise ratio (SNR) of the following A/D converters (ADCs) 50. Suitable video preamps for this purpose include the National LM 1205 and LM 1283.

Gain control for these amplifiers (one per color) can be either fixed or variable, depending upon the embodiment. Most simply, the gain control is fixed by the factory. In a further variant, the gain control is fixed in the factory, though the user has physical access to a gain control adjusting means.

In another embodiment, the gain control is variable and is controlled by a control circuit 44 in the A/D section 24 having a digital to analog converter (DAC) for generation of the control signal. An appropriate D/A for this purpose is the Analog Devices AD8403AR10. The gain control (also referred to as contrast control) is adjusted jointly for all three amplifiers (i.e. each of RGB). In addition, there are manual, independent balance adjustments for each of the colors.

One A/D per color is employed in the embodiment of the present invention. An alternative embodiment employs pixel interleaving due to the compression afforded by this technique. Pixel interleaving is described in commonly assigned U.S. patent application Ser. No. 08/538,116 entitled "Video Interface System Utilizing Reduced Frequency Video Signal Processing," incorporated herein by reference. In a third embodiment of the present invention not employing such interleaving, two A/Ds per color are used for video rates above 75 MHz.

Since the analog input is AC coupled, it is necessary for the analog front end 42 to also perform DC restore in order to establish a reference level in the amplified analog signal, for each of the colors. A back porch clamp is employed for the purpose of clamping the amplified input signal to a known reference during a clamp interval, and is illustrated in FIG. 12. Other clamping or DC restore techniques can be employed.

In the preferred embodiment, eight bits per primary color are digitized. A suitable device for the A/Ds 50 includes the Philips TDA8714. In an alternative embodiment, six bits are employed for color representation. The choice hinges upon desired (or required) color depth.

The eight-bit video data representations per color are clocked into two banks of pixel bus buffers 54. One pixel's worth of data is clocked into one bank of buffers 54 on even pixel clock cycles, while another pixel's worth of data is clocked into the other bank of buffers 54 on odd pixel clock cycles. Suitable buffers for this function include 74LVT574SM chips from Texas Instruments.

Also in the A/D circuit block 24 is a sync processor 46, such as a Mitsubishi M52347SP. There are three common video sync protocols. In the first, each of HSYNC and VSYNC are provided separately as digital signals between 1–5 Vpp. In the second, a composite digital sync signal is provided on the HSYNC signal line. Lastly, an analog composite sync signal is extracted from the green analog signal ("sync on green", or "SOG"), with a negative polarity for positive video. Inputs to the sync signal processor 46 therefore include externally received HSYNC and VSYNC, as well as the green analog input signal. The sync processor 46 is configured to automatically select a suitable one of these protocols.

Outputs of the sync processor include: HSYNC+ and VSYNC+, correlating to HSYNC and VSYNC signal timings, respectively; CLAMP+, used by the analog front end 42 in timing the DC restore, as previously discussed; and status bits usable by local processing to indicate what sync type was input to the sync processor 46.

HSYNC+ is used as an input to a phase fine tune (PFT) circuit 48. The PFT 48 adjusts where the video signal is sampled by the ADC 50 within a pixel lifetime by employing an adjustable delay of HSYNC+. The output of an RC charging circuit such as that shown in FIG. 14 is compared, using for instance an Analog Devices AD9696, with a control voltage generated by the control circuit 44 in the generation of H(pft)+. An external adjustment such as an encoder is provided on the exterior of the hub 20 chassis to enable manual adjustment of the control voltage, in an illustrative embodiment. Other encoders exist, such as those on the attached heads 28. The state of these encoders is also reported back to the control circuit 44. Therefore, the present invention is responsive to adjustment of PFT at either a central location such as the hub, or remotely, such as at the heads.

Also within the A/D circuit block 24 is a video clock regenerator circuit 52 including a fully programmable clock regenerator such as an ICS1522 made by Integrated Circuit Systems, Inc., a phase locked loop (PLL) frequency synthesizer. The clock regenerator is serially programmed in a preferred embodiment of the present invention by the control circuit 44 to generate four clock outputs, each at ¼ the sampled pixel rate and 90 degrees out of phase with the following output, which collectively comprise a clock at the sampled pixel rate. Various frequencies are employed, depending upon the video data rate. For illustrative purposes, 75 MHz is used herein.

In addition to the clock regenerator/frequency synthesizer, the clock regenerator circuit 52 is comprised of a MOSFET bus switch, such as a Texas Instruments 74CBT3125 quad bus switch. The purpose of the MOSFET bus switch is to generate two 75/2 MHz clocks, 180 degrees out of phase with each other, from the four 75/4 MHz staggered clock signals from the clock regenerator/frequency synthesizer.

With respect to FIG. 15, four switches are provided in the 74CBT3125 bus switch used in the preferred embodiment. Each switch is a MOSFET switch having an inverted-input output-enable associated therewith. The first clock signal from the clock regenerator is fed to the input of the first switch, and the second clock signal, 90 degrees out of phase (lagging) with the first clock signal, is connected to the output enable for the first switch. The third and fourth clock signals are connected to the second switch in a similar manner. The outputs of the first two switches are then tied together, providing an output clock with clean rising edges due to the speed of the switches and having a period of 75/2 MHz.

Likewise, clock two is connected to the input of switch three, and clock three is connected to the output enable of switch three. Clock four is connected to the input of switch four, and clock one is connected to the output enable of switch four. The outputs of switches three and four are also tied together. The resulting output is also a 75/2 MHz clock signal, though 180 degrees out of phase with the output from the first two switches.

Each of the 75/2 MHz outputs from the bus switch are used to clock a respective PLL clock driver such as the CDC536 from Texas Instruments as part of the video clock regenerator 52. This part enables the generation of a doubled output, a 75 MHz clock also referred to as the ADCLK or "dot clock", which is used to clock the ADCs 50. Once again, other frequencies are employable as required.

In addition, the clock driver provides 75/2 MHz clocks ("PCLK/2+" and "PCLK/2−") of like phase with respect to the clocks from which they are derived. Such clocks are used to clock the pixel bus buffers 54 latching digital video data out of the ADCs 50, since data gate arrays in the frame buffer logic 36 can't run at speeds such as 75 MHz (data gate arrays are discussed later).

In the first embodiment of the present invention, the sampling rate does not exceed 75 MHz, with the limitation being found in the analog preamplifier of the analog front end 42 and in the speed of the ADCs 50.

The clock regenerator circuit 52 also enables the regeneration of HSYNC, in a form referred to as LOCHSYNC, or local HSYNC, even without an external HSYNC. Thus, an on-screen display chip is utilized in a further embodiment of the present invention for the generation of on-screen menus. LOCHSYNC is employed by the control circuit 44 in controlling the output of the frame buffers 26.

The on-screen display chip (not illustrated) is employed in the A/D circuit block 24, and specifically, in conjunction with the analog front end 42. Analog output from this chip is mixed into the A/Ds 50. A single user interface to this chip is provided.

In one embodiment of the present invention, control over when and for what duration a frame buffer 26 captures video data resides within the A/D circuit block 24, and in particular within the video clock regenerator 52 using gating signals. However, since such signals would only gate one frame buffer 26, such embodiment is not preferred.

The control circuit 44 provides a VSYNC disable to the video clock regenerator 52 to disable the PLL during vertical intervals. Otherwise, spikes generated by the PLL in the vertical interval would cause errors in forward error correction.

Functions of the control circuit 44 in the A/D circuit block 24 have previously been alluded to, such as the generation of the analog preamplifier gain control, creation of VControl for use in the PFT 48, generation of the Vsync disable and serial data signals for use in the video clock regenerator 52. Structurally, the control circuit comprises in a preferred embodiment the following elements.

As discussed, a DAC is required in the generation of amplifier gain control. Other elements comprising the control circuit include a serially programmable digital potentiometer, such as an Analog Devices AD8403AR10, which enables the generation of A/D circuit-internal control signals such as: CONTRAST, an adjustment to the video preamp in the analog front end 42; CLAMP_WDTH, used in the sync signal processor; and the PFT control signal previously discussed.

Primarily, however, the control circuit is comprised of a C25 microprocessor with an XC5202 microprocessor gate array. Principal signals received by the control circuit 44 include clocks from the video clock regenerator 52, and HSYNC+ and VSYNC+ from the sync processor 46. Clearly, in the actual implementation, there is a much higher degree of interconnectivity than that which is alluded to here.

For the purposes of programming the control circuit 44, a serial PROM and a parallel EEPROM provide data to the gate array and microprocessor, respectively. The use of the parallel EEPROM enables the reprogrammability of the hub. Further, the microprocessor and associated gate array are in communication with devices external to the hub 20 via a serial port disposed on one end of the hub 20. A UART (universal asynchronous receiver/transmitter), such as a TL16C550A, and a TTL to EIA level translator such as an MAX211E, enable this serial communication.

The control circuit is also in communication with devices external to the hub 20 through LAN ports, such as BNC or RJ45 connectors. Standard LAN interfaces are employed in a preferred embodiment, such as an SMC91C94 LAN chip, coupled to a DP8392 encoder. Such a LAN interface enables programmability of the hub 20 as an addressable port on a LAN shared by devices other than hubs, or as a port on a LAN dedicated solely to one or more hubs in communication with a configuring device or devices. In either case, the hub 20 is a "dumb" device which only responds when directed to from an intelligent device. The serial communication can be either 10Base2 or 10BaseT.

Finally, as previously noted, a DDC bus enables configuration of the hub 20 by the host computer 16. This bus is comprised of two data signals, SDA (serial data) and SCL (serial clock), +5 VDC, and return. The DDC channel is normally employed, in the prior art, as a unidirectional pathway to a repository of peripheral device configuration information available to a host. Here, however, the C25 processor reads and writes the DDC memory dynamically with information pertaining to the configuration of the hub and the attached heads. The DDC memory, which can be discrete or part of the control circuit memory, is then read by a host.

Therefore, the control circuit can be configured, or reconfigured, via internal replacement of programmed memory devices, external communication to removable configuring devices such as via a LAN interface, or by input from the host computer. Such configuration information can include, explicitly or implicitly, the point (row and pixel) within the frame at which each displayed segment is to begin.

From the A/D circuit block 24, digital video data is provided in parallel as eight bits per color per pixel, with two pixels being provided per clock cycle, for a total of 48 bits. Other signals which are provided by the A/D circuit block 24 include: USB signals, which are for future expansion in the present embodiment and are therefore terminated at a daughter board connector proximate the frame buffer circuitry; horizontal and vertical sync signals from the sync signal processor 46; various clock signals originating in the video clock regenerator 52; a start of frame signal generated by the control circuit 44 from the horizontal and vertical syncs; and serial control data also generated by the control circuit 44.

Figure 5:
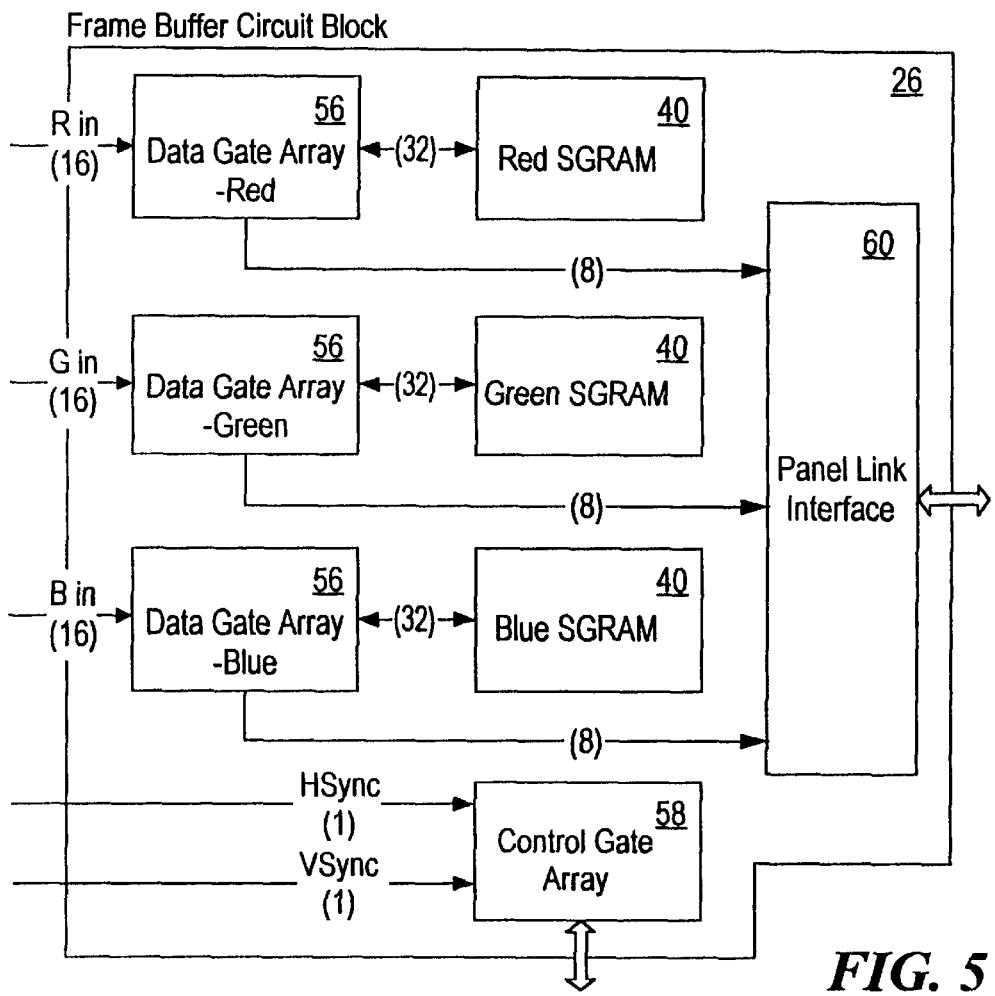
FIG. 5 is generally a block diagram of one of the blocks labelled "Frame Buffer" in FIG. 3.

One frame buffer circuit block 26 is illustrated in FIG. 5 at a first order of detail, bearing in mind that there are up to four frame buffer circuit blocks 26 in each hub in a first embodiment, each capable of providing digital video data to a respective display head 28.

Sixteen parallel bits of video data per color (two pixels) are received by a respective data gate array 56. The data gate array 56 enables the storage of the video data in the respective SGRAM 40 if the data is part of the desired portion 12 of the video display buffer in the VGA 18, based upon control received from an associated control gate array 58. In the preferred embodiment of the present invention, there is one control gate array 58 per frame buffer logic circuit 36, though in an alternative embodiment, one control gate array 58 is shared between two frame buffer logic circuits 36.

If the video data is desired for display on the associated head 28, the data is stored in the respective, single-ported SGRAM 40. As required, the data is then removed from the SGRAM 40 where it passes again through the data gate array 56 to the panel link 60, the latter acting as an output interface to the associated head 28.

Figure 6:
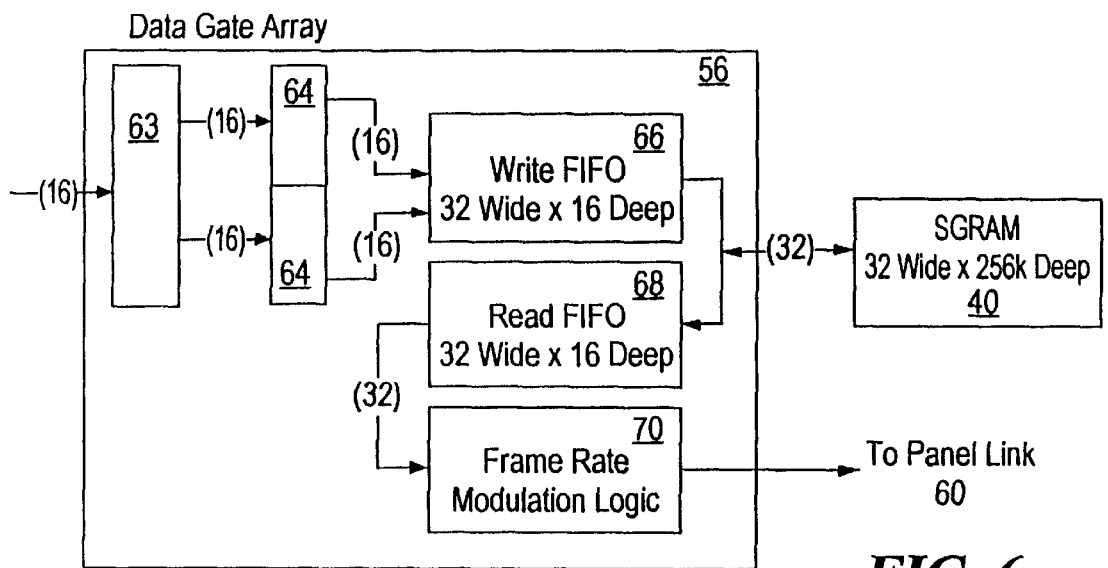
FIG. 6 is generally a block diagram of one of the blocks labelled "Data Gate Array" in FIG. 5.

On a more detailed level, FIG. 6 provides an illustration of a data gate array 56 and an associated SGRAM 40 for a single color channel. Video data input to the data gate array 56 for one of the three colors, two parallel eight-bit pixels, is received on sixteen parallel signal paths at approximately 80 MPixels/sec (or 40 MPixelPairs/sec) within a demux 63 in the data gate array 56. This demux 63 enables the distribution of the input data into two sixteen bit registers 64, which in turn provide thirty-two bit parallel data to a 32 bit wide, 16 bit deep write FIFO 66.

Figure 7:
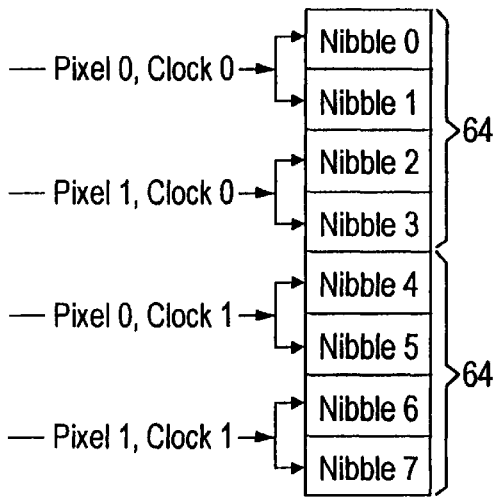
FIG. 7 illustrates data distribution during data gate array register loading for data driving an active matrix display.
Figure 9:
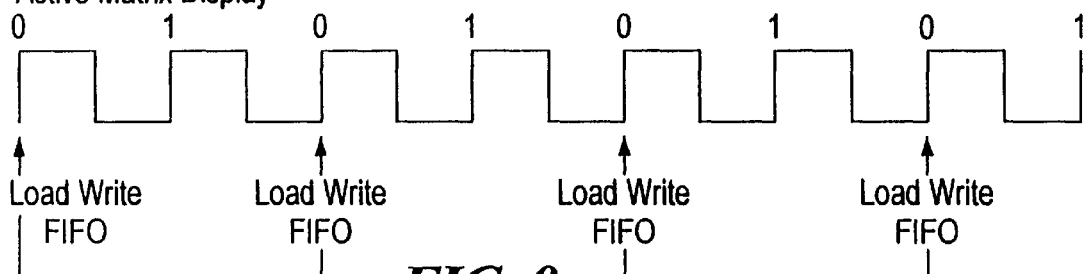
FIG. 9 illustrates the timing of data transfer within the data gate array of FIG. 6 for data driving an active matrix display.

How the data is transferred into the registers 64 depends upon the type of head 28 associated with this color channel as conveyed by the head 28 to the control circuit 44 (via the DDC backchannel) through the serial port to the control gate array 58 (on a separate serial bus). For an active matrix LCD display, all eight bits per pixel are utilized. As shown in FIGS. 7 and 9, the upper of the two registers 64 is filled with four four-bit nibbles during clock cycle zero, representing two eight-bit pixels for this color. On clock cycle one, two more pixels are loaded into the lower sixteen-bit register 64. On the following clock cycle, clock cycle two, the 32 bits of data representing four pixels for this color are clocked into the write FIFO 66 and the upper register 64 is written with the next two pixels. The clock speed into the write FIFO 66 is 20 MHz for active matrix displays in the first embodiment of the present invention. Other exemplary embodiments employ other clock speeds.

Figure 8:
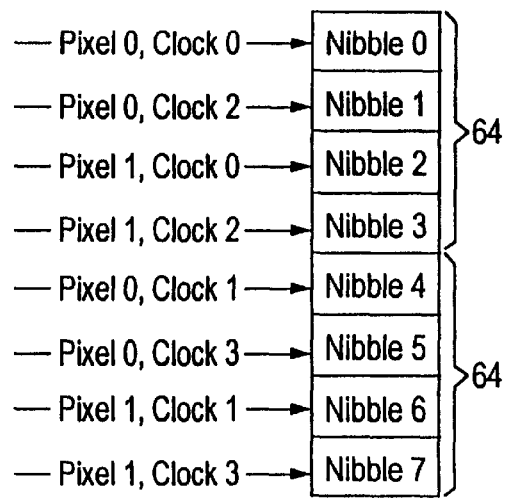
FIG. 8 illustrates data distribution during data gate array register loading for data driving a passive matrix display.
Figure 10:
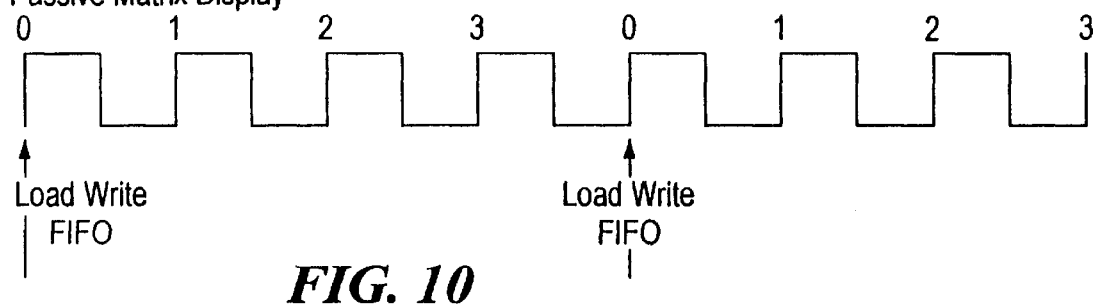
FIG. 10 illustrates the timing of data transfer within the data gate array of FIG. 6 for data driving a passive matrix display.

If the associated head 28 is a passive matrix display, the lower four bits of each eight bit pixel are dropped and the upper four bits are clocked into the registers 64 as indicated in FIGS. 8 and 10. On successive clock cycles, the upper four bits for each pixel are stored in respective portions of the registers 64, while the lower four bits are dropped. On clock cycle four, the data in the registers 64 are clocked out to the write FIFO 66 and the process of receiving the upper four bits per pixel in the registers 64 begins again. The clock speed into the write FIFO 66 for passive matrix displays is 10 MHz.

The output of the write FIFO 66 is connected to a 32-bit data path. Also connected to this data path are the respective single-ported SGRAM 40, which is 32 bits wide by 256 kbytes deep, and a read FIFO 68 of the same dimensions as the write FIFO 66. A suitable SGRAM 40 for this application is an IBM038329N06A-10, which operates at 50 MHz. Desired video buffer portion 12 data from the write FIFO 66 is read into the SGRAM 40 under the control of the control gate array 58.

In a first embodiment of the present invention, data out of the write FIFO 66 is written to the SGRAM 40 for eight clock cycles, the 32-bit wide bus is idle for two clock cycles, data is read out of the SGRAM 40 and into the read FIFO 68 for eight clock cycles, then the bus goes idle for another two clock cycles. The desired portion 12 data can be any contiguous portion of the video buffer data from the video graphics adapter 18 in the host computer 16, limited maximally in size by the characteristics of the associated head 28.

When and how much data is stored in the SGRAM 40 is mandated by the control gate array 58. In a first, preferred embodiment of the present invention, the control circuit 44 in the A/D circuit block 24 provides the control gate array 58 in the frame buffer logic block 26 with horizontal and vertical offsets, relative to the start of frame notification, via the serial data path between the two for the commencement of data storage in the SGRAM 40. These offsets are used to control a video microsequencer implemented in the control gate array 58 for enabling the transfer of digital video data into the video registers 64, and subsequently into the write FIFO 66. A memory controller, also implemented in the control gate array 58, controls the transfer of data from the write FIFO 66 to the SGRAM 40, and from the SGRAM 40 to the read FIFO 68. Finally, a panel microsequencer, again, implemented in the control gate array 58, controls the output of data from the read FIFO 68 to Frame Rate Modulation (FRM) logic 70 (discussed subsequently).

The benefit of providing these three independent elements, the video microsequencer, the memory controller, and the panel sequencer, lies in that the writing of data can take place at a different rate than the reading of data; the memory controller effectively disconnects the potentially disparate write and read function rates.

The programming of the video microsequencer with the offset information is preferred due to the ease of adjusting the offset values when a respective head is replaced or when the display characteristics for a head are changed. How much data to store is calculated by the control circuit 44 based upon display size, resolution, and orientation as learned from the respective head 28 via the DDC backchannel. The frame signal is used for interlaced video applications, the control gate array 58 using this signal to identify even versus odd frames.

In alternative embodiments, data storage in the SGRAM 40 is solely under the control of the control circuit 44, the latter sending the equivalent of "on" and "off" signals to the control gate array 58. A drawback of such control lies in the need for separate control lines between the control circuit 44 and each control gate array 58.

In yet another embodiment, the control circuit 44 provides "on" signals to the control gate array 58, and the control gate array 58 provides the "off" signal based upon backchannel information relating to the associated head 28. The multiplicity of control signals is once again a drawback of this embodiment.

The memory controller tracks the data flowing into and out of the FIFOs 66, 68 and the SGRAM 40. If the write FIFO 66 is less than half full, a write to the SGRAM 40 from the write FIFO 66 is disabled; if the read FIFO 68 is more than half full, the SGRAM 40 is prevented from writing to the read FIFO 68. The bus intermediate the FIFOs 66, 68 and the SGRAM 40 remains idle during the clock cycles which would otherwise be used for writing data from or reading data to the SGRAM 40.

From the read FIFO 68, data is clocked into a frame rate modulation logic circuit (FRM) 70 which formats the 32-bit wide data according to whether the associated head 28 is passive or active matrix, and outputs eight-bit wide data to the panel link 60 associated with that frame buffer 26 (there is one panel link 60 per frame buffer 26). For active matrix displays, the FRM 70 executes an algorithm which reserializes the input data by taking the four, eight-bit wide pixels, buffering them, and outputting the data as sequential eight-bit wide pixel data. The maximum input rate into the panel link from the FRM 70 is up to 65 MHz in the present embodiment.

For a passive matrix array as the associated head 28, the FRM 70 executes a conversion algorithm which also receives 32 parallel bits, but in the form of eight, four-bit pixels. The algorithm converts the four bit pixels into one-bit pixels using frame rate modulation. This involves the use of a look-up table in the FRM 70 and the frame number which is passed from the A/D control circuit 44 to the control gate array 58 to the FRM 70. The algorithm effectively averages the color of the same pixel over time, and compares the possible values for this pixel against that of surrounding pixels to enable the use of one-bit per pixel with minimized visual artifacts. The output of the FRM 70 for an associated passive matrix display is eight parallel one-bit pixels. Alternatively, any suitable FRM technique may be employed.

In an alternative embodiment in which the speed of the SGRAM 40 is sufficiently greater than that currently available, the data format for an associated passive matrix display could be four eight-bit pixels in parallel into the FRM 70, instead of the current eight four-bit pixels.

In a passive matrix display, the frame rate is twice that of the active matrix display. Typical values are 120 Hz frame rate for a passive matrix display versus 60 Hz for an active matrix display. The chief advantage of passive matrix displays is cost; presently, such passive displays cost roughly one-third the cost of active matrix displays.

An active matrix display may take two pixels per clock cycle, in order. However, a "dual scan passive" display provides four one-bit pixels per clock cycle at both a top and bottom half of a display. Thus the difference in frame rate.

The panel link 60 receives eight bits per pixel per color, or 24 bits per pixel total, at up to 65 MHz for an associated active matrix panel head 28, four times the FRM 70 input clock rate. The panel link 60 receives pixel data for an associated passive matrix display at approximately 20 MHz, the same as the input rate into the FRM 70.

The panel link 60, such as a Chips & Technologies 65100, formats the input data for provision to the respective head 28. It receives the three eight-bit data streams from the FRMs 70, one for each color, and using the HSYNC and VSYNC signals from the A/D control circuit 44 via the control gate array 58 formats the data for output over four differential lines at a connector to the respective head 28.

The panel link provides its outputs to the respective head 28 over the display device cable 30 as four twisted pairs. This cable 30 also provides 12V power and ground, a USB backchannel (the latter not being employed in the present embodiment), and the DDC backchannel to the control circuit 40. Four of the twisted pairs are for the RGB data and data clock. One twisted pair is for the DDC backchannel. Another twisted pair is for the USB. Each of the USB and DDC backchannels provide individual data and clock paths, and share 5V, 12V and ground which are also conveyed in this cable to the respective head 28.

Other elements of the presently disclosed hub 20 include registers which preserve the setup information of the panel link 60, data gate array 56, and other elements, as received from the control circuit 44.

Figure 16:
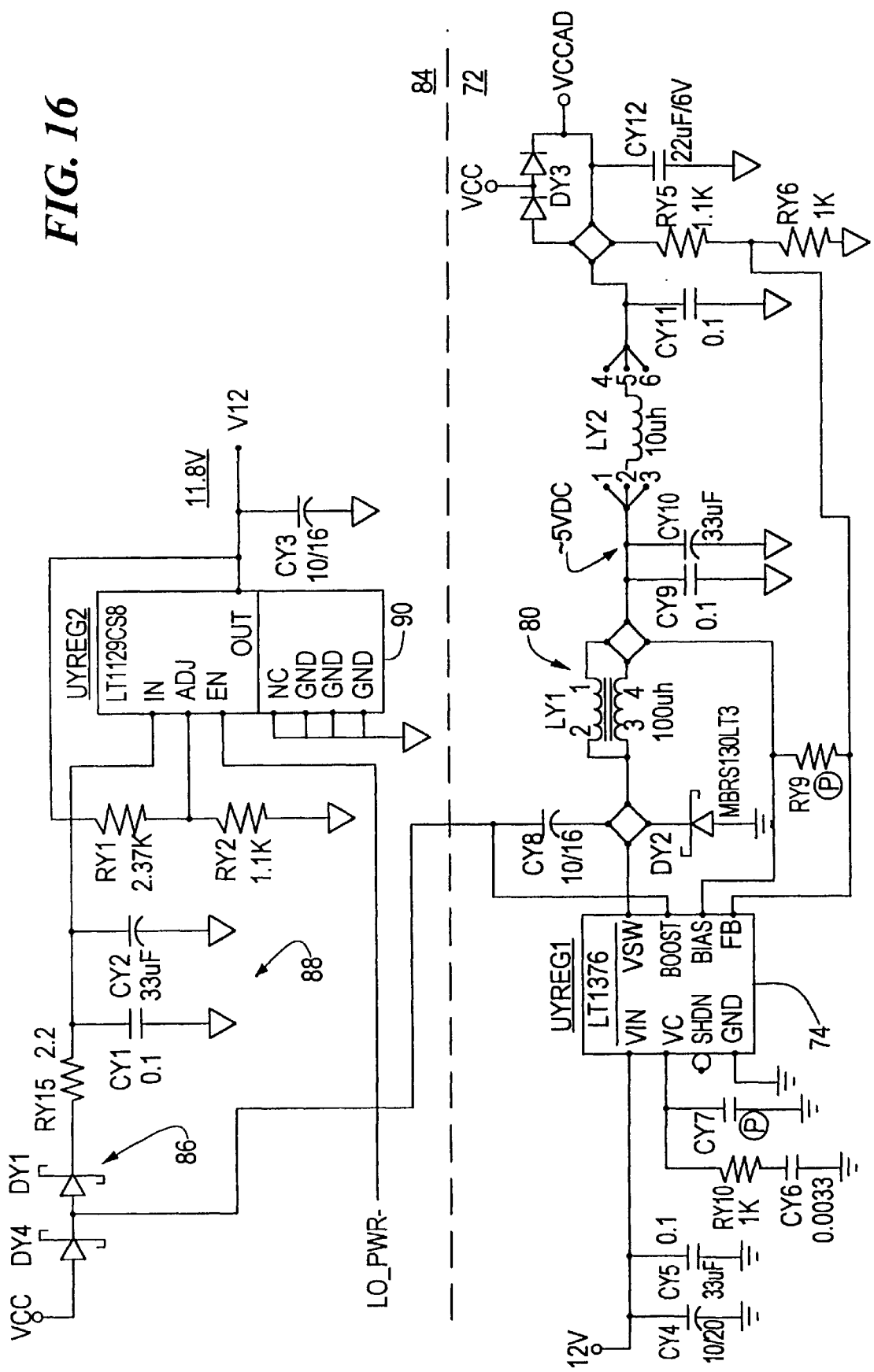
FIG. 16 is a schematic of a switching DC/DC converter used in the present invention with an integrated charge pump used to supply an auxiliary output.

The power requirements for the present hub 20 are unregulated 12 VDC. This is supplied to DC/DC converters which generate 5V and 3.3V for use as logic supplies. The unregulated 12 VDC is used as an input to an analog power and control circuit which includes a switching DC/DC converter 72, as shown in FIG. 16. The 12 VDC is applied to a buck switching regulator drive 74. This drive can take many forms, such as a switching regulator (e.g. a Linear Technology LT1376), or a regulator controller. The output of this drive 74, essentially a 12 Vpp rectangular wave, is coupled through an inductor 80 to a filter capacitor (or capacitors) 82 at the output of the inductor 80 in the common buck configuration, to supply 5 VDC for use in the analog section.

The output of the regulator drive 74 is also employed to drive a charge pump providing a higher-voltage input to an auxiliary DC supply circuit, generally designated 84 in FIG. 16. This circuit 84 includes alternately-conducting diodes 86, and one or more reservoir capacitors 88 coupled to a micropower low dropout regulator (e.g. a Linear Technology LT1129) 90, effectively providing a regulated, auxiliary 12 VDC output. Other voltages can be generated, depending upon system requirements.

In an alternative embodiment of the present invention, the hub 20 is configured to accept a digital video input. The data gate array 56 in this embodiment is configured to properly format the input digital data prior to its processing by the write FIFO 66, the SGRAM 40, the read FIFO 68, the FRM 70, and the panel link 60. Such a hub 20 can be configured to accept either analog data input as previously described or digital data input, or can accept just digital data, eliminating some of the cost of the circuitry associated with the analog front end in the A/D circuit block 24. In an embodiment of the present hub 20 which accepts digital data directly, buffers such as the pixel bus buffers 54 are employed to temporarily hold the digital data prior to processing by the data gate array 56.

In yet further alternative embodiments, the digital output of the hub is employed as a digital input to one or more subsequent hubs. The panel link interface 60 can also be replaced with D/A converters. Such an embodiment could then drive conventional CRTs, or could provide analog input to one or more subsequent hubs. Additionally, the inputs and outputs of the hub 20 can be adapted to receive and/or transmit data in an optical format.

Modifications and substitutions to the present invention made by one of ordinary skill in the art is considered to be within the scope of the present invention, which is not to be limited except by the claims which follow.

What is claimed is:

1. A video distribution apparatus, comprising:
a video distribution hub for receiving a video input signal and for providing plural video output signals to corresponding output ports, each video output signal representing a selected portion of said video input signal, said video distribution hub further comprising plural frame buffer logic elements, each for receiving said video input signal, for selectively capturing said selected portion of said video input signal, and for selectively providing said video output signal to said corresponding output port,
said video input signal comprising more data than that which is displayable at one time by at least one video display device attachable to a corresponding output port.

2. The video distribution apparatus of claim 1 further comprising a host for providing said video input signal.

3. The video distribution apparatus of claim 2, wherein said host comprises a video graphics adapter having an interface to said hub, said video input signal being an RGB analog signal.

4. The video distribution apparatus of claim 2, wherein said host further comprises a display buffer for storing video data corresponding to said video input signal.

5. The video distribution apparatus of claim 1, wherein said video input signal is a digital signal.

6. The video distribution apparatus of claim 1, wherein
said video input signal is an analog signal, and
said video distribution hub further comprises an analog-to-digital circuit element for converting said video input signal to a digital signal.

7. The video distribution apparatus of claim 6, wherein said analog-to-digital circuit element comprises an analog-to-digital converter (ADC) for each color component of said analog signal, each analog-to-digital converter for providing a digital ADC signal.

8. The video distribution apparatus of claim 7, wherein said analog-to-digital circuit element comprises buffers for storing said digital ADC signals.

9. The video distribution apparatus of claim 6, said analog-to-digital circuit element further comprising a control circuit for receiving information descriptive of a video display attachable to a corresponding output port and for generating horizontal and vertical offset data referencing an initial capture point in said video input signal.

10. The video distribution apparatus of claim 9, wherein said descriptive information is received from at least one of a user and said attachable video display.

11. The video distribution apparatus of claim 6, wherein said analog-to-digital circuit element further comprises a sync processor for providing synchronization signals for said video input signal.

12. The video distribution apparatus of claim 6, wherein said analog-to-digital circuit element further comprises a video clock regenerator for providing clocks employable within said video distribution hub.

13. The video distribution apparatus of claim 6, wherein said analog-to-digital circuit element further comprises an on-screen display circuit providing an output which is multiplexable with said digital ADC signals.

14. The video distribution apparatus of claim 1, wherein said video input signal is comprised of plural color components, and wherein each of said frame buffer logic element, comprises a frame buffer data capture circuit for each of said video input signal color components, each of said frame buffer data capture circuits for receiving said a respective video input signal color component and for selectively providing said video input signal color component to said corresponding output port.

15. The video distribution apparatus of claim 14, wherein each of said frame buffer data capture circuits further comprises a data processing element and a data storage element,
said data processing element for receiving and selectively forwarding said video input signal color component to said data storage element for storage, and further for receiving said stored video input signal color component from said data storage element and for providing said stored video input signal color component as a portion of said video output signal to said corresponding output port.

16. The video distribution apparatus of claim 15, wherein each of said frame buffer logic elements further comprises a display interface for receiving and converting said stored video input signal color component to said video output signal having a data format appropriate for a respective video display attached to said corresponding output port.

17. The video distribution apparatus of claim 14, wherein each of said frame buffer logic elements further comprises a frame buffer control circuit for controlling the selective provision of said video input signal color component.

18. The video distribution apparatus of claim 1, wherein at least one of said plural frame buffer logic elements further comprises a digital-to-analog conversion element and said video output signal provided by said least one of said frame buffer logic elements is an analog signal.

19. The video distribution apparatus of claim 1, wherein said video distribution hub further comprises an external communications port enabling external hub configuration control.

20. The video distribution apparatus of claim 1, further comprising a communications channel between a video display attachable to each of said plural output ports and said video distribution hub enabling said hub to auto-configure based upon data received from each of said video displays.

21. The video distribution apparatus of claim 20, wherein at least one of said plural video displays is a flat panel display.

22. The video distribution apparatus of claim 1, wherein said plural video output signals represent non-contiguous portions of said video input signal.

23. The video distribution apparatus of claim 1, wherein said plural video output signals represent contiguous portions of said video input signal.

24. The video distribution apparatus of claim 1, wherein said plural video output signals represent overlapping portions of said video input signal.

25. The video distribution apparatus of claim 1, further comprising at least one second video distribution hub for receiving a respective one of said plural video output signals.

26. A video distribution hub, comprising:
a front end for receiving a video signal;
plural output ports; and
plural frame buffer elements in communication with said front end and said output ports, each frame buffer element for selectively capturing at least a portion of said received video signal and for providing a signal representative of the respective captured portion to a corresponding one of said plural output ports, wherein said video signal comprises more data than that which is displayable at one time by at least one video display device attachable to a corresponding one of said plural output ports.

27. The video distribution hub of claim 26, wherein said video signal is a digital signal, and said front end further comprises buffers for receiving said digital video signal prior to communicating said digital video signal to said plural frame buffer elements.

28. The video distribution hub of claim 26, wherein said video signal is an analog signal, and said front end further comprises:

an analog-to-digital conversion portion for converting said analog video signal to a digital video signal; and buffers for buffering said digital video signal prior to communicating said digital video signal to said frame buffer elements.

29. The video distribution hub of claim 26, wherein said front end comprises a sync processor for generating synchronization signals from said video signal.

30. The video distribution hub of claim 26, wherein said front end comprises a control circuit for generating control signals for controlling the selective capturing of the received video signal.

31. The video distribution hub of claim 30, further comprising a data path for providing data from a video display device attachable to one of said output ports to said control circuit.

32. The video distribution hub of claim 30, wherein each of said plural frame buffer elements comprises:

plural data processing elements for selectively capturing a portion of said received video signal; and a control element responsive to said control signals for controlling said selective capture of said received video signal portions in said plural data processing elements.

33. The video distribution hub of claim 32, wherein each of said plural data processing elements further comprises:

a data manipulation portion; and a storage element, wherein said data manipulation portion is adapted for receiving said video signal, for selectively forwarding said portion of said video signal to said data storage element, for receiving a stored portion of said video signal from said storage element, and for reformatting said stored video signal portion and providing said reformatted video signal portion to a corresponding one of said output ports.

34. The video distribution hub of claim 32, wherein said control element further comprises:

a video sequencer responsive to said control signals for reformatting said received video signal and for controlling said selective capture of said received video signal portion;

a memory controller for coordinating temporary storage of said selectively captured video signal portion; and a panel microsequencer responsive to said control signals for reformatting said temporarily stored video signal portion.

35. The video distribution hub of claim 26, further comprising an external interface port for hub configuration control.

36. The video distribution hub of claim 26, wherein each of said plural frame buffer elements further comprises a digital-to-analog converter, enabling said hub to provide an analog, reformatted video signal output to a corresponding one of said output ports.

37. The video distribution hub of claim 36, wherein said analog, reformatted video signal output is provided as an input to a like video distribution hub attachable to said corresponding one of said output ports.

38. A video hub for distributing a digital video signal, comprising:

plural frame buffer elements, each for selectively capturing portions of said video signal, for reformatting said captured video signal portions, and for providing said reformatted video signal portions to a corresponding output interface in a form compatible with a video display device or devices attachable thereto, wherein said video signal comprises more data than that which is displayable at one time by at least one video display device attachable to a corresponding output interface.

39. The video hub of claim 38, wherein each of said plural frame buffer elements comprises:

plural data processing elements for selectively capturing and reformatting a portion of said received video signal;

a control element for controlling said selective capture and reformatting of said received video signal in said plural data processing elements; and an output interface for receiving said video signal portions from said plural data processing elements and for providing said captured and reformatted video signal portions to said corresponding video display device attachable thereto.

40. The video hub of claim 39, wherein each of said plural data processing elements further comprises:

a data manipulation portion; and a storage element, wherein said data manipulation portion is adapted for receiving said video signal, for selectively forwarding said video signal portions to said data storage element, for receiving a stored portion of said video signal from said storage element, and for reformatting said stored video signal portion and providing said reformatted video signal portion to said output interface.

41. The video hub of claim 39, wherein said control element further comprises:

a video sequencer for formatting said received video signal and for controlling said selective capture of said received video signal;

a memory controller for coordinating temporary storage of said selectively captured video signal portion; and a panel microsequencer for reformatting said temporarily stored video signal portion according to characteristics of said plural video display device attachable to said corresponding output interface.

42. The video hub of claim 38, wherein each of said plural frame buffer elements further comprises a digital-to-analog converter, enabling said hub to output an analog, reformatted video signal portion.

43. A video distribution hub for processing an RGB video signal received from a video graphics board containing a video buffer, said video graphics board having an output interface and operative to provide at said output interface an RGB video signal representative of data stored in said video buffer, said video distribution hub comprising:

an input port for receiving said RGB video signal;

an analog to digital converter section for generating digital signals representative of said RGB video signal;

a plurality of frame buffers for storing said digital signals for display on respective ones of a corresponding plurality of video displays;

a frame buffer controller for storing in each of said frame buffers said digital signals corresponding to a user selectable portion of said data stored in said video buffer; and a plurality of output port controllers for converting the digital signals stored in respective frame buffers to a signal format compatible with a corresponding video display or displays and for providing signals in said video display compatible format as outputs at each respective output port, wherein said RGB video signal comprises more data than that which is displayable at one time by at least one video display attachable to a corresponding output port.

44. A method of distributing a portion of a video input signal to one of plural video display devices using a video distribution hub, said method comprising the steps of:

receiving said video input signal at a front end of said hub from an external source, said video input signal comprising more data than is displayable on at least one of said plural video display devices at one time;

forwarding said video input signal as a digital signal from said front end to plural frame buffers of said hub;

capturing a portion of said digital signal with one of said frame buffers;

reformatting said digital signal portion with said frame buffer; and providing said reformatted digital signal portion from said frame buffer to a respective one of said plural video display devices.

45. The method of claim 44, wherein said step of receiving further comprises receiving an analog signal as said video input signal at said hub front end, and said step of forwarding further comprises converting said analog signal at an analog-to-digital converter within said hub front end to said digital signal.

46. The method of claim 44, wherein said step of receiving further comprises receiving said video input signal as a digital signal at said hub front end.

47. The method of claim 44, wherein said step of capturing further comprises selectively loading registers within said frame buffer with said digital signal.

48. The method of claim 47, wherein said step of capturing further comprises selectively loading based upon control data received from said hub front end at said frame buffer.

49. The method of claim 44, wherein said step of capturing further comprises selectively storing said digital signal portion in a memory within said frame buffer.

50. The method of claim 44, wherein said step of reformatting further comprises accumulating and frequency shifting said digital signal portion within said frame buffer to accommodate said video display device.

51. The method of claim 44, wherein said step of providing further comprises receiving said reformatted digital signal portion from said frame buffer at an output interface for conversion to a signal format required by said video display device.

52. A method for driving a plurality of flat panel displays, each having a specified input signal format, in response to an RGB video signal representative of a video image stored as data in a video buffer, said method comprising the steps of:

receiving said RGB video signal at an input port of a video distribution hub, said hub further including a plurality of output ports for driving said plurality of flat panel display monitors, said RGB video signal comprising more data than that which is displayable at one time by at least one of said plurality of flat panel displays;

converting said received RGB video signal to a plurality of digitized signals representative of said video image;

storing in each of a plurality of frame buffers associated with respective ones of said plurality of output ports digitized data corresponding to a user specified portion of said video image contained in said video buffer; and for each of said plurality of frame buffers, generating an output signal in a format compatible with the input signal format associated with the respective one of said plurality of flat panel displays.

* * * * *